(12) United States Patent
Oelgoetz et al.

(10) Patent No.: US 6,364,197 B1
(45) Date of Patent: Apr. 2, 2002

(54) FRICTION STIR WELDING OF CONTAINERS FROM THE INTERIOR

(75) Inventors: Peter A. Oelgoetz, Huntsville; Jack Lee Weeks, Scottsboro; Douglas M. Todd, Hazel Green, all of AL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/632,771

(22) Filed: Aug. 4, 2000

(51) Int. Cl.[7] .................. B23K 20/12; B23K 31/02; B23K 37/00
(52) U.S. Cl. .................. 228/112.1; 228/2.1; 228/113
(58) Field of Search ................ 228/112.1, 113, 228/2.1

(56) References Cited

U.S. PATENT DOCUMENTS

| | | | |
|---|---|---|---|
| 4,721,546 A | * | 1/1988 | Clark et al. .................. 156/567 |
| 4,741,788 A | * | 5/1988 | Clark et al. .................... 156/64 |
| 5,697,511 A | | 12/1997 | Bampton |
| 5,829,664 A | * | 11/1998 | Spinella et al. .......... 228/112.1 |
| 6,173,880 B1 | * | 1/2001 | Ding et al. ................... 228/2.1 |
| 6,247,633 B1 | * | 6/2001 | White et al. ............. 228/112.1 |
| 6,247,634 B1 | * | 6/2001 | Whitehouse ............. 228/112.1 |

\* cited by examiner

Primary Examiner—Tom Dunn
Assistant Examiner—Zidia Pittman
(74) Attorney, Agent, or Firm—Stout, Uxa, Buyan & Mullins, LLP; Donald E. Stout

(57) ABSTRACT

An apparatus and method for friction stir welding a seam in a hollow container from the inside. The apparatus includes a weld head convertible between a retracted state to an expanded state. The retracted weld head fits through an opening in the container and then expands to enable formation of the weld. The weld head includes a frame and a least one friction stir welding spindle convertible between a retracted position adjacent the frame and an expanded position away from frame. The container may be a pressure vessel tank, with a circular weld being formed between a tubular mid-section and a hemispherical end cap. Desirably, multiple friction stir welding spindles that expand into a common plane are provided, and relative rotation between the weld head and container forms the circular seam. Force balance arms intermediate adjacent friction stir welding spindles expandable to contact the interior of the container may also be provided to help maintain the position of the weld head. Means for rotating the spindles such as a motor may be provided in the frame. An external anvil hoop may be provided surrounding the seam being welded for further backing support for the internal friction stir welding spindles. Cameras adjacent each weld member monitor the weld process, and may provide visual positioning aids.

32 Claims, 2 Drawing Sheets

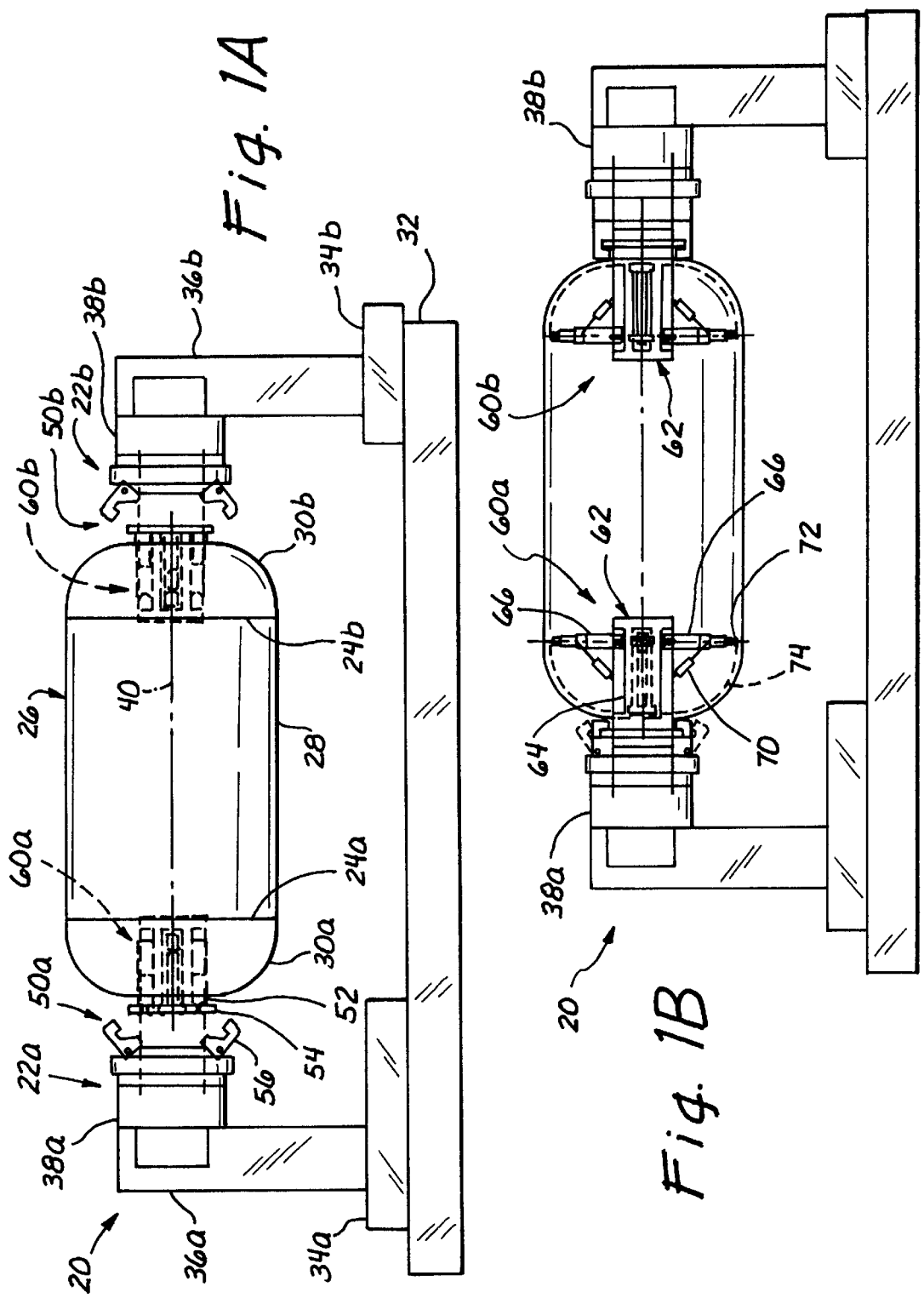

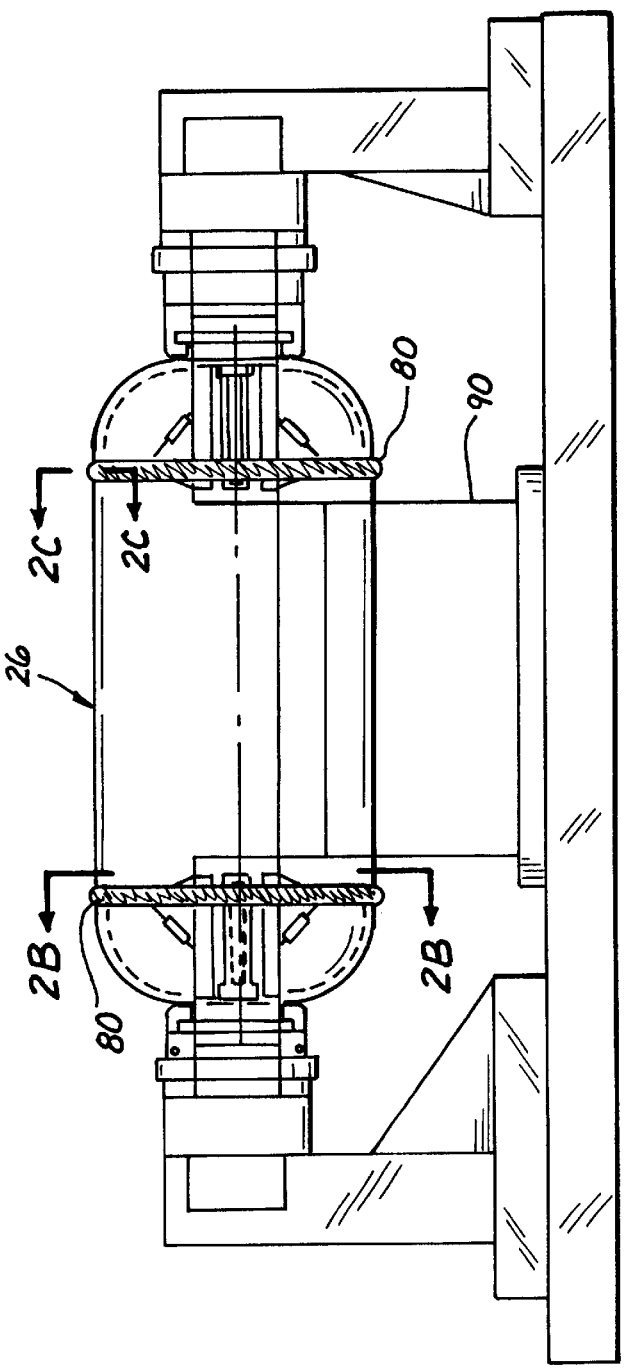
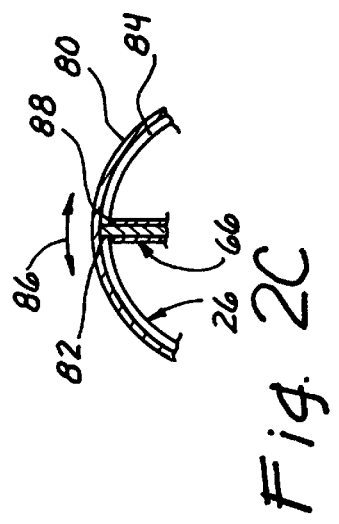
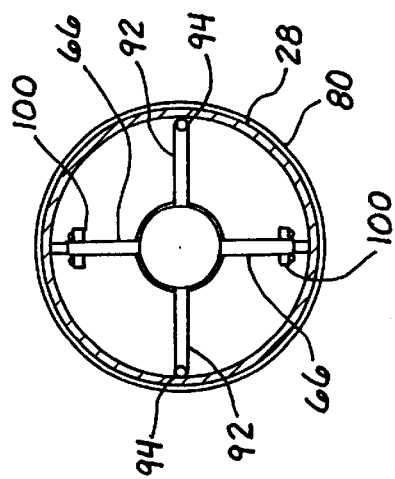

FRICTION STIR WELDING OF CONTAINERS FROM THE INTERIOR

FIELD OF THE INVENTION

The present invention pertains to the welding of pressure vessels and, more particularly, to apparatuses and methods for friction stir welding of pressure vessels from the inside.

BACKGROUND OF THE INVENTION

Friction welding is based on the principal of "rubbing" together two articles to be joined so as to generate a sufficient amount of heat and plasticize the adjacent surfaces. The frictional heat is generated solely by the adjacent work pieces to be joined.

A more robust version of friction "stir" welding utilizing a rotating, non-consumable probe or pin has been developed. The pin is of a harder material than the work pieces to be joined, and relative cyclic movement of the pin generates the frictional forces to plasticize the workpiece material. Because of this movement of the non-consumable pin, the method has been named friction stir welding, with the pin "stirring" the material. Aluminum is a particularly suitable soft material that can be readily friction stir welded. The aerospace industry is aggressively pursuing friction stir welding of aluminum panels for the outer skins of launch vehicles because of the weld quality and repeatability.

In a conventional butt joint, for example, the pin spins or linearly reciprocates and travels along the interface between the adjacent or "faying" work piece surfaces to create the plasticize weld joint. Typically, the two work pieces are placed on a backing surface and are tightly held together to prevent separation during the friction stir welding process. Further, a stationary shoulder surrounding the moving pin applies forging pressure to the area around the faying surfaces on the opposite side from the backing surface to prevent the plasticized material from extruding out of the joint. The result is a relatively smooth and void-free joint.

Friction stir welding, because of its many advantages, is being considered as an attractive process for the assembly of aluminum tanks, particularly large aluminum alloy pressurized tanks, such as those utilized for cryogenic oxygen storage in space launch systems. Because of the large compressive forces involved in friction stir welding, the final welds in these tank structures present a problem of how to adequately provide backing support inside the tank, particularly when access to the tank interior is restricted. Outside diameter (OD) circumferential welding requires tooling to be erected inside the pressure vessel so as to provide a path for the friction stir welding spindle axial load from one exterior side of the vessel to the other where a rigid fixture is provided. The installation and removal of tooling from inside of the tank is time-consuming and may damage the tank.

One technique for friction stir welding of tanks is disclosed in U.S. Pat. No. 5,697,511 to Bampton, wherein an internal disk-shaped support is provided within the tank along the weld line. The internal support provides backing for the external friction stir welding tool, and coalesces into the weld line to become an integral part of the tank pressure vessel. This undesirably adds to the weight of the finished tank.

There is thus a need for an improved apparatus and method for welding large pressure vessels.

SUMMARY OF THE INVENTION

The present invention provides an apparatus for function stir welding a seam in a container from the inside, the container being of the type having an opening to the inside. The apparatus comprises a convertible welding head having at least one friction stir welding (FSW) spindle mounted thereon adapted to passed through the opening in the container with the FSW spindle in a retracted state and weld the seam from the inside of the container with the FSW spindle in an expanded state. The weld head is too large to fit through the opening of the container with the FSW spindle in its expanded state. Preferably, the weld head includes a plurality of FSW spindles.

In one embodiment, the weld head has a central frame and a force balance arm convertible between a retracted state and an expanded state. The FSW spindle extends outward from the frame in a first direction in its expanded state, and the force balance arm extends outward from the frame in a second direction different than the first direction in its expanded state. The weld head may also include a second FSW spindle and a second force balance arm, wherein in its expanded state the second FSW spindle extends outward from the frame in a direction opposite the first direction, and in its expanded state the second force balance arm extends outward from the frame in a direction opposite the second direction. Preferably, the two FSW spindles and two force balance arms extends outward from the frame in substantially the same plane, and the oppositely-directed spindles extend along a line that is 90 degrees offset from a line along which the oppositely-directed force balance arms extend.

Recesses in the frame for receiving the FSW spindles and force balance arms in their retracted states may be provided to reduce the profile of the weld head. An apparatus for converting the FSW spindles from their retracted to their expanded states, and vice versa, may include a piston/cylinder mechanism. Furthermore, one or more sensors or cameras may be provided on the weld head to facilitate positioning of the FSW spindle with respect to the container, and/or to monitor the friction stir welding operation.

In accordance with one aspect of the invention, the FSW spindles pivot with respect to the central frame from their retracted states generally adjacent to the central frame and aligned along the axis, to their expanded states pivoted about 90° away from the central frame with respect to the axis. The central frame may house at least one motor for rotating the FSW spindles.

The present invention may also provide a pair of headstocks linearly movable along a common axis. Each of the headstocks has a weld head mounted thereon, the weld heads extending toward each other along the common axis. With this arrangement, two seams in the container may be simultaneously welded using the two weld heads positioned inside the container. In a particularly efficient application, the container is a least partly tubular and the seams are circular about the ends of the container. A stand for supporting and rotating the tubular container is provided, wherein the weld heads remain stationary in their expanded states while the tubular container rotates therearound to enable welding of the circular seams.

In accordance with a further aspect of the invention, an external anvil support is provided around the container at the seam to supply a backing surface for the internal friction stir welding operation. If the seam is circular, the anvil is a circular hoop.

The present invention also provides a method for friction stir welding a seam between two sections of a container, the container having an interior space and an opening thereto defining an axis and being smaller than a cross-section of the interior space normal to the axis. The method includes providing a convertible weld head having at least one FSW spindle mounted thereon adapted to pass through the opening in the container with the spindle in a retracted state. The weld head is too large to fit through the opening in the container with the FSW spindle in an expanded state. The method further includes passing the weld head with the FSW spindle in its retracted state from the outside of the container to the interior space through the opening. The FSW spindle is displaced from its retracted state to its expanded state, and the seam is welded from the inside of the container.

The container may include a tubular section, wherein the seam being welded is circular. The method therefore may include causing relative rotation between the tubular section and the weld head during the step of welding the seam. This relative rotation is desirably caused by rotating the tubular section about the axis of the opening while holding the weld head stationary. Desirably, the method further includes externally supporting the container at the seam during the step of welding the seam, and more preferably providing an anvil hoop around container at circular seams.

The method may further include providing a second convertible weld head similar to the first, passing the two weld heads with their FSW spindles in their retracted states from the outside of the container to the interior space through respective openings, displacing the FSW spindles in the weld head from their retracted states to their expanded states, and simultaneously welding the two seams from the inside of the container by rotating the tube about the axis while holding the weld heads stationary.

A further understanding of the nature advantages of the invention will become apparent by reference to the remaining portions of the specification and drawings.

BRIEF DESCRIPTION OF THE DRAWINGS

FIG. 1A is an elevational view of an apparatus for friction stir welding a pressure vessel from the inside prior to clamping of the vessel (shown in phantom) and deployment of dual friction stir welding spindles;

FIG. 1B is an elevational view of the apparatus of FIG. 1A after clamping of the vessel and deployment of the friction stir welding spindles;

FIG. 2A is an elevational view of the friction stir welding apparatus of the present invention with a pressure vessel mounted on a stand for rotation and clamped between linearly translating headstocks, and showing an external anvil hoop surrounding the seams to be welded;

FIG. 2B is a sectional view through the tank taken along line 2B—2B of FIG. 2A and illustrating a multi-spindle friction stir welding head in an expanded state; and FIG. 2C is a sectional view taken along line 2C—2C of FIG. 2A, showing the relative positioning of a stir welding pin for welding the tank.

DESCRIPTION OF THE PREFERRED EMBODIMENTS

The present invention discloses apparatus and methods for welding a seam in a container from the inside of the container. It should be understood, however, that the invention facilitates welding of seams in hollow objects, in general. Therefore, objects that have an interior space, but are not considered containers per se may be welded using the apparatus of the present invention. For example, two sections of tube may be butt welded together using the apparatus and methodology of the present invention. Consequently, the term "container" should be understood to mean hollow objects in general.

FIGS. 1A and 1B illustrate an exemplary welding system 20 of the present invention particularly suited to simultaneously welding multiple seams in tubular pressure vessels. As illustrated, a pair of spaced-apart welding apparatuses 22a, 22b are shown positioned to weld identical circular seams 24a, 24b in a container 26 (shown in phantom). The container 26 may take a variety of forms, as mentioned above, but the system 20 is particularly useful for welding seams in pressure vessels. Therefore, the container 26 illustrated may be a pressurized liquid storage tank including a tubular mid-section 28 and a pair of generally hemispherical end caps 30a, 30b, with the circular seams 24a, 24b forming welded joints therebetween.

One or both of the welding apparatuses 22a, 22b is mounted to linearly translate along a base 32. In this regard, the base 32 may feature one or more linear slides (optional) on which carriages 34a, 34b precisely translate without undue friction. The welding apparatuses 22a, 22b each comprise a carriage 34a, 34b supporting a generally vertically disposed stand 36a, 36b, and a headstock 38a, 38b. The headstocks 38a, 38b extend generally horizontally from an upper portion of the respective stand 36a, 36b, and in the illustrated embodiment are centered on and project toward one another along a common axis 40. In this manner, the distance between the headstocks 38a, 38b may be varied by translation of one or both of the carriages 34a, 34b along the base 32. If only one apparatus 22a, 22b translates along the base 32, the other may be fixed.

Each headstock 38a, 38b includes a clamping mechanism 50a, 50b for securely holding a respective end of the container 26. In the illustrated embodiment, the container 26 includes a pair of oppositely directed cylindrical openings defined by a tubular neck 52 and an outwardly extending annular flange 54. In the normal configuration, both tubular necks 52 defining the openings are concentric about the axis 40, although the openings may be offset or differently angled. The clamping mechanism 50a, 50b may take a variety forms, as will be appreciated by one of skill in the art, depending on the container structure. For example, two or more (preferably three or more) pivoting clamps 56 are provided on each headstock 38a, 38b for holding the neck 52 and flange 54. FIG. 1B illustrates the movement of each of the pivoting clamps 56. The clamps 56 are actuated using conventional techniques, not further illustrated herein.

Each apparatus 22a, 22b further includes a convertible weld head 60a, 60b projecting along the axis 40, preferably toward one another as shown. The weld heads 60a, 60b convert between a retracted state, as seen in FIG. 1A, and an expanded state, as seen in FIG. 1B. The convertibility of the weld heads 60a, 60b enables their passage, in their retracted states, through the respective openings defined at the end of the container 26. In use, the weld heads 60a, 60b first pass through the openings in their retracted states and then convert into their expanded states so as to weld the seams 24a, 24b from the interior of the container 26. In a typical application, the openings in the container 26 are smaller than the cross-section of the interior space of the container. That is, the weld heads 60a, 60b each translate along an axis centered in the associated opening (with the axes of the opposed openings in a tank as shown being co-linear), and expand into an interior space normal to the axis that is larger than the opening. After the seams 24a, 24b are welded, the weld heads 60a, 60b convert back to their retracted states, and withdraw from the container through the openings.

Various mechanisms can be utilized to expand the weld heads 60a, 60b within the interior space, determined primarily by the type of weld head to be used. In this regard, and as mentioned above, the expansion mechanism must at least be able to convert at least one weld head from a retracted state enabling introduction of the weld head through the container opening, to an expanded state enabling internal welding of a seam between components of the container. In the illustrated and primary embodiment, the weld heads 60a, 60b comprise friction stir welding spindles, and the expansion mechanism must be sufficiently rigid to apply, or at least resist, axial loading along the spindles during the welding process. Therefore, as one of skill in the art will appreciate, the weld heads may incorporate structure to pivot, telescope, or otherwise radially expand a friction stir welding spindle from a retracted to an expanded position. Moreover, because friction stir welding spindles require rotation, the expansion mechanism must be integrated and cooperate with means for rotating the spindles.

With reference now to FIG. 1B, exemplary expansion mechanisms for the weld heads 60a, 60b are illustrated on both ends of the container 26 (now shown in section). Each weld head 60a, 60b includes a centrally-located frame 62a, 62b that is rigidly supported by and projects horizontally from a respective headstock 38a, 38b. Again, the frames 62a, 62b are desirably centered about the common axis 40 and project toward one another. It should be noted here that the illustrated system of welding two seams 24a, 24b in one container 26 is particularly efficient for containers like the type shown, with a tubular mid-section 28 and two end caps 30a, 30b, but that a single weld head may be preferred for applications where only a single seam is required.

Each frame 62a, 62b includes at least one recess 64 for receiving a friction stir welding (FSW) spindle 66 in its retracted state. Desirably, the recess 64 receives the FSW spindle 66 so that no part of the weld member extends outward from the overall dimensions of the frame 62. In its retracted state, therefore, the weld head 60 can fit through the opening of the container 26. Of course, it should be understood that if the frame 62 and FSW spindle 66 are sufficiently small relative to the opening, the recess 64 may not be necessary to reduce the profile of the weld head 60 in its retracted state sufficient to pass through the opening.

In the illustrated embodiment, each FSW spindle 66 is mounted to pivot about a point 68 that is located close to the distal end of the frame opposite the headstock 38. The FSW spindle 66 thus pivots about the point 68 from the retracted position shown in FIG. 1A to the expanded position shown in FIG. 1B. One mechanism for automatically pivoting the FSW spindle 66 includes an actuating member 70, such as a hydraulic piston/cylinder pivotally mounted at one end to the frame 62 and at the other end to the FSW spindle 66. Extension of the piston/cylinder causes the connected FSW spindle 66 to pivot. The actuated member 70 may alternatively be a solid mechanical linkage that operates without fluid pressure chambers (such as, for example, with gears and levers). Or, the actuating member 70 may be pivotally mounted at one end to the frame 62 and at the other end to a linear slide (not shown) in the frame 62, wherein displacement of the linear slide causes pivoting of the connected FSW spindle 66. In any event, the actuating member 70 is controlled remotely by means in the headstock 38 (e.g., fluid chambers or wires), which are in turn controlled by a processing unit or manual input means (not shown).

As mentioned above, a preferred FSW spindle 66 extends longitudinally and rotates about its own axis with respect to the frame 62. As such, a motor (not shown) is desirably provided within the frame 62 to rotate each spindle. The motor desirably mounts adjacent to the plane into which the FSW spindles 66 expand, preferably housed internally within the frame 62. Alternatively, one motor may be provided to drive more than one FSW spindle 66 through the use of gears or the like. Further, the motor may be mounted within the headstock 38, or other remote location, and may communicate with the FSW spindle 66 by belts, shafts, chains, or the like. Those of skill in the art will understand that accommodation must be made for the pivoting nature of the FSW spindle 66 such that the drive motor may be engaged through a universal joint, for example.

In the illustrated embodiment, the FSW spindle 66 pivots from a retracted position adjacent the frame 62 and preferably in the recess 64 to an expanded position away from the frame 62. In FIG. 1B, the path of rotation of a distal tip 72 of the lower left FSW spindle 66 is indicated by the dashed line 74. The angle of rotation may vary, but is preferably about 90° to maximize the column strength of each FSW spindle 66 and associated expansion mechanism to withstand axial loading. That is, axial loading of the FSW spindle 66 as applied to the distal tip 72 will be transferred directly along the axis of weld member, and to the pivot point 68 on the frame 62. This arrangement thus maximizes axial loading strength of the weld head 60. Of course, the desired angle may vary depending on the normal axis from the surface/seam being welded. For example, in the illustrated embodiment, the FSW spindle 66 has maximum column strength when pivoted 90° from the retracted position, because the seam 24 is defined between two surfaces that are generally parallel to the axis 40. Other surface/seam orientations are contemplated, whereby the FSW spindle 66 may be pivoted more or less than 90°.

Up to now, the weld head 60 has been described as having at least one FSW spindle 66. In a preferred embodiment, however, the weld head 60 has two FSW spindles 66 diametrically opposed to one another across the frame 62. Because the pivot point 68 of both FSW spindles 66 are located in the same plane along the axis 40 of the frame 62, and are diametrically opposed across the frame 62, expansion of weld members to the preferred angle of 90° aligns both weld members along a common axis. Additionally, as both FSW spindles 66 contact an interior surface of the seam 24 being welded, and will accordingly be subjected to axial loading, this arrangement helps balance forces on the frame 62. Furthermore, this arrangement increases the maximum amount of axial loading that can be accommodated by the weld head 60, limited only to the column strengths, respectively, of each of the FSW spindles 66, the actuating mechanisms for maintaining weld members in their expanded state, the pivot points 68, and the central frame 62.

Now with reference to FIGS. 2A–2C, an anvil hoop 80 is shown surrounding the container 26 at the location of each of the seams 24a, 24b (FIG. 1A). The anvil hoops 80 are utilized to provide external support for the container 26 at the seams 24a, 24b, and provide a backing structure to withstand the outward forces imposed by each of the weld heads 60a, 60b from the interior of the container 26. The anvil hoops 80 may take a variety of forms, but are preferably bands of metal that have a higher plastic transition temperature than the material of the container 26. For example, if the container components are aluminum, then the anvil hoops 80 may be iron or steel. The construction of the anvil hoops 80 may be solid rings closely fit around the mating components of container 26, or the anvil hoops 80 may comprise two or more components that are clamped together, such as with the use of flanges and bolts.

FIG. 2C is a cross-sectional view through the seam 24b showing the extension of a function stir welding pin 82 of the FSW spindle 66 to the depth of the faying surface 84 of the tubular mid-section 28, and close to the anvil hoop 80. In practice, the friction stir welding pin 82 extends outward into close but not touching proximity to the anvil hoop 80, and relies on a certain throwing power to plasticize the material of the container components between it and the anvil hoop. Either the FSW spindle 66 or container 26 rotates to cause their relative rotation, as indicated by the arrows 86, around the seam 24b. FIG. 2C also illustrates an annular friction stir welding shoulder 88 that abuts the interior surface of the container components at the seam 24b. As is well-known in the friction stir welding art, the shoulder 86 applies a substantial forging force against the mating container components. The friction stir welding pin 82 rotates at a high rate of speed to plasticize the faying surfaces at the seam 24b, which coalesce at the trailing edge of the FSW spindle 66 under the restraining/forging force of shoulder 86.

In the preferred embodiment, the weld heads 60a, 60b remain stationary (i.e., in the 6:00 and 12:00 positions as seen in FIG. 2B) while the container 26 rotates thereabout. Specifically, a container stand 90 shown in FIG. 2A supports and rotates the components of the container 26 through a mechanism not shown. In one embodiment, the anvil hoops 80 clamp down at the seams 24a, 24b to retain the end caps 30a, 30b in juxtaposition with the tubular mid-section 28, and the container stand 90 simply rotates the tubular mid-section. Alternatively, the container stand 90 may directly support and rotate all three components of the container 26.

With reference to FIG. 2B, a pair of force balance arms 92 are shown extending from the frame 62 at the 3:00 and 9:00 positions. The force balance arms 92 each include at least one roller 94 at a distal end that contacts the interior of the container 26 and is sufficiently rugged to withstand significant axial loading. Although not shown, each force balance arm 92 pivots about the frame 62 in the same manner, as does each FSW spindle 66. That is, the force balance arms 92 convert from a retracted position adjacent the frame 62, to an expanded position rotated 90° with respect to the retracted position. In this manner, the force balance arms 92 extend in directly opposite directions, and preferably along the same line, when extended. Additionally, the extended force balance arms 92 preferably lie in the same plane as the extended FSW spindles 66. The force balance arms 92 provide lateral support to the frame 62, and indirectly to the FSW spindles 66, during use of the weld heads 60a, 60b. A single roller 94 may be provided at the distal end of each force balance arm 92 that directly contacts the respective seams 24a, 24b. Alternatively, a dual pair of axially spaced rollers may be provided that straddles the seams 24a, 24b.

As mentioned above, the weld heads 60a, 60b may include one or more FSW spindles 66. If only one FSW spindle 66 is provided, one or more balance arm 92 may be provided to counterbalance the axial loading forces. Likewise, if three FSW spindles 66 in three quadrants are used, a single balance arm 92 in the remaining quadrant may be utilized. Moreover, four FSW spindle 66 circumferentially spaced apart 90° may be utilized, without force balance arms 92, or with force balance arms extending at 45 degree intervals between each pair of weld members, much like spokes of a wheel. In short, it should be understood that a variety of combinations of weld members and force balance arms are possible.

FIG. 2B also illustrates at least one sensor or camera 100 mounted near the distal end of each weld member and point outward toward the container 26. By providing a camera 100 to view the formation of the welds at the seams 24a, 24b, quality control is facilitated. In a preferred embodiment, a pair of cameras 100 is provided to view both the leading edge and trailing edge of the welding area. These cameras 100 communicate via wires or remote means to a monitor for real time viewing, or to a recorder for future reference. In addition, the sensors or cameras 100, or other such sensors on the weld heads 60a, 60b help orient and position the FSW spindles 66 in the proper position with respect to the seams 24a, 24b. That is, the sensors or cameras 100 help axially position the weld heads 60a, 60b so that the FSW spindles 66 pivot outward into the plane of the seams 24a, 24b. Alternatively, positioning may be accomplished without the aid of sensors, by simply relying on reference locations, closely toleranced workpieces, and accurate monitored movement of the weld heads 60a, 60b and FSW spindles 66.

While the foregoing is a complete description of the preferred embodiments of the invention, various alternatives, modifications, and equivalents may be used. Moreover, it will be obvious that certain other modifications may be practiced within the scope of the appended claims.

What is claimed is:

1. An apparatus for friction stir welding a seam in a container from the inside, the container being of a type having an opening to the inside, comprising:

a convertible weld head having at least one friction stir welding (FSW) spindle mounted thereon adapted to pass through the opening in the container with the FSW spindle in a retracted state and weld the seam from the inside of the container with the FSW spindle in an expanded state, the weld head being too large to fit through the opening of the container with the FSW spindle in its expanded state.

2. The apparatus of claim 1, wherein the weld head includes a plurality of FSW spindles.

3. The apparatus of claim 1, wherein the weld head includes a central frame and a force balance arm convertible between a retracted state and an expanded state, and wherein in its expanded state the FSW spindle extends outward from the frame in a first direction, and the force balance arm in its expanded state extends outward from the frame in a second direction different than the first direction.

4. The apparatus of claim 3, wherein the weld head includes a second FSW spindle and a second force balance arm, and wherein in its expanded state the second FSW spindle extends outward from the frame in a direction opposite the first direction, and the second force balance arm extends outward from the frame in a direction opposite the second direction.

5. The apparatus of claim 4, wherein the FSW spindles and the force balance arms extend outward from the frame in substantially the same plane, and wherein the oppositely-directed spindles extend along a line that is 90° offset from a line along which the oppositely-directed force balance arms extend.

6. The apparatus of claim 1, wherein the weld head includes a central frame generally aligned along an axis, and at least a pair of FSW spindles that extend outward in opposite directions from the frame in their expanded states.

7. The apparatus of claim 6, wherein the FSW spindles pivot with respect to the central frame from their retracted states generally adjacent to the central frame and aligned along the axis, to their expanded states pivoted about 90° away from the central frame with respect to the axis.

8. The apparatus of claim 6, wherein the central frame houses a least one motor for rotating the FSW spindles.

9. The apparatus of claim 1, further including:

a pair of headstocks linearly movable along a common axis, each of the headstocks having thereon one of the weld heads so that the weld heads extend toward each other along the common axis, wherein the apparatus is adapted to simultaneously weld two seams in the container using the two weld heads positioned inside the container.

10. The apparatus of claim 9, wherein the container is at least partly tubular and the seams are circular about the ends of the tubular container, the apparatus further including a stand for supporting and rotating the tubular container, wherein the weld heads remain stationary in their expanded states while the tubular container rotates therearound.

11. The apparatus of claim 1, further including an anvil adapted to mount to the exterior of the container along the seam and provide backing support for the FSW spindle.

12. The apparatus of claim 11, wherein the seam is circular and the anvil is a circular hoop.

13. The apparatus of claim 1, further including at least one sensor positioned on the weld head for observing the interior of the container.

14. An apparatus for friction stir welding, comprising:
a weld head including a frame and a motor; and
a friction stir welding (FSW) spindle having one end pivotally mounted on the frame and coupled to be rotated by the motor, the spindle being adapted to pivot about the one end from a retracted position generally adjacent to the frame to an extended position away from the frame.

15. The apparatus of claim 14, wherein the frame is generally aligned along an axis, and wherein the retracted position of the spindle is generally adjacent to the frame and aligned along the axis, and the extended position of the spindle is pivoted away from the frame by about 90° with respect to the axis.

16. The apparatus of claim 15, further including a second FSW spindle having one end pivotally mounted on the frame, the second spindle having a retracted position generally adjacent to the frame and aligned along the axis, and an extended position pivoted away from the frame by about 90° with respect to the axis.

17. The apparatus of claim 16, wherein the first and second spindles are mounted to pivot on opposite sides of the frame, and wherein the spindles extend in opposite directions in their extended positions.

18. The apparatus of claim 16, further including a second motor in the frame coupled to rotate the second spindle.

19. The apparatus of claim 14, wherein the frame includes a recess for receiving the spindle in its retracted position and sized so that the spindle does not substantially protrude beyond the recess in its retracted position.

20. The apparatus of claim 14, further including a piston/cylinder mechanism mounted to the frame for pivoting the spindle between its retracted and extended positions.

21. The apparatus of claim 14, further including at least one sensor positioned on the weld head for observing the interior of the container.

22. The apparatus of claim 21, wherein the sensor is a camera having its lens aligned with the FSW spindle to observe the friction stir welding operation.

23. A method for friction stir welding a seam between two sections of a container, the container having an interior space and an opening thereto defining an axis and being smaller than a cross-section of the interior space normal to the axis, the method including:

providing a convertible weld head having at least one friction stir welding (FSW) spindle mounted thereon adapted to pass through the opening in the container with the FSW spindle in a retracted state, the weld head being too large to fit through the opening in the container with the FSW spindle in an expanded state;

passing the weld head with the FSW spindle in its retracted state from the outside of the container to the interior space through the opening;

displacing the FSW spindle from its retracted state to its expanded state; and welding the seam from the inside of the container using the FSW spindle in its expanded state.

24. The method of claim 23, further including:
after welding the seam, displacing the FSW spindle from its expanded state to its retracted state; and
removing the weld head from the container through the opening.

25. The method of claim 23, wherein one of the sections of the container is a tube and wherein the seam is circular about one end of the tube, the method including causing relative rotation between the tube and the weld head during the step of welding the seam.

26. The method of claim 25, wherein the tube is concentric about the axis of the container opening.

27. The method of claim 25, wherein step of causing relative rotation comprises rotating the tube about the axis while holding the weld head stationary.

28. The method of claim 27, wherein the container has a second seam and a second opening disposed along the axis, the method further including:

providing a second convertible weld head having at least one FSW spindle mounted thereon adapted to pass through the second opening in the container with the FSW spindle in a retracted state, the second weld head being too large to fit through the second opening in the container with the FSW spindle in an expanded state;

passing the second weld head with the FSW spindle in its retracted state from the outside of the container to the interior space through the second opening;

displacing the FSW spindle in the second weld head from its retracted state to its expanded state; and simultaneously welding the two seams from the inside of the container using the two weld heads with the respective FSW spindles in their expanded states by rotating the tube about the axis while holding the weld heads stationary.

29. The method of claim 23, wherein the weld head includes a frame on which the FSW spindle is pivotally mounted, and wherein the step of displacing the FSW spindle from its retracted state to its expanded state comprises pivoting the FSW spindle away from the frame.

30. The method of claim 26, further including the step of externally supporting the container at the seam during the step of welding the seam.

31. The method of claim 27, wherein the seam is circular, and the step of externally supporting the container comprises securing an anvil hoop around the container at the seam.

32. The method of claim 23, further including:
observing the interior of the container with at least one sensor on the weld head.

* * * * *